3/22/88 XR 4,732,817

United States Patent [19]

Lotz et al.

[11] Patent Number: 4,732,817

[45] Date of Patent: Mar. 22, 1988

[54] WOOD PRESERVATION

[76] Inventors: W. Robert Lotz, 9559 N. Regent Rd., Milwaukee, Wis. 53217; Donald F. Hollaway, 441 Buck Island Rd., West Yarmouth, Mass. 02673

[21] Appl. No.: 853,982

[22] Filed: Apr. 21, 1986

[51] Int. Cl.[4] .......................... B05D 1/18; C09D 5/16; C09D 5/18

[52] U.S. Cl. ................................ 428/541; 106/18.31; 106/18.35; 106/18.36; 427/440; 428/907

[58] Field of Search ................ 427/440; 428/541, 907; 106/18.31, 18.35, 18.36

[56] References Cited

U.S. PATENT DOCUMENTS

| | | | |
|---|---|---|---|
| 3,635 | 6/1844 | Spicker . | |
| 70,761 | 11/1867 | Taylor . | |
| 84,733 | 12/1868 | Cowling . | |
| 107,904 | 10/1870 | Hayes . | |
| 142,892 | 5/1873 | Bretonniere . | |
| 216,589 | 3/1879 | Wellhouse et al. . | |
| 901,095 | 10/1908 | Hall . | |
| 901,096 | 10/1908 | Hall . | |
| 901,097 | 10/1908 | Hall . | |
| 901,098 | 10/1908 | Hall . | |
| 901,099 | 10/1908 | Hall . | |
| 913,128 | 2/1909 | Hall . | |
| 924,770 | 6/1909 | Hall . | |
| 933,435 | 9/1909 | Hall . | |
| 964,017 | 7/1910 | Hall . | |
| 1,010,122 | 11/1911 | DeCew . | |
| 1,057,211 | 3/1913 | Baekeland . | |
| 1,670,086 | 5/1928 | Walker . | |
| 1,774,940 | 9/1930 | Mengel . | |
| 2,062,877 | 12/1936 | Goodale | 21/38 |
| 4,075,394 | 2/1978 | Meyer | 428/537 |
| 4,218,516 | 8/1980 | Meyer et al. | 428/537 |
| 4,220,688 | 9/1980 | Mitchell et al. | 428/541 |
| 4,413,023 | 11/1983 | Chow | 427/440 X |
| 4,532,161 | 7/1985 | Collins et al. | 427/440 |
| 4,539,235 | 9/1985 | Collins et al. | 427/440 |

*Primary Examiner*—Michael R. Lusignan

[57] ABSTRACT

Wood which is relatively poorer in connection with its ability to resist weathering, rotting, insect attack, etc., is made more resistant to such factors by a two-step process. The first step is to impregnate the poorer quality wood with an aqueous solution of tannin extract taken from a plant species which has superior weathering and other resistance properties. The wood treated with the tannin extract is then further treated with an aqueous solution of a fixative to prevent leaching of the extract during use of the wood, e.g., in exterior applications. The process of the present invention not only results in preservation of the wood, but can also be used for purposes of coloring the initial wood product. Abundant and relatively cheap woods can then be converted into wood products having qualities more closely like those of more expensive woods. In addition to the above-noted advantages, the present invention also uses treating substances which are non-hazardous and which are not damaging to the environment. (Metallic salt solutions may also be employed for coloration and for providing additional decay resistance.).

29 Claims, No Drawings

WOOD PRESERVATION

BACKGROUND OF THE INVENTION

1. Field of the Invention

The present invention relates generally to the art of wood preservation, and more particularly to the art of increasing the resistance of pressure permeable wood species to deterioration caused by weathering, leaching or attack by fungi, insects, marine borers, etc., and in certain embodiments to the art of coloring wood during the preservation process.

2. Description of the Prior Art

It has been known for many years that woods of various types may be preserved by chemical treatment. For example, lumber has been treated with creosote to prevent decay and to prevent termite attack. More recently, pentachlorophenol has been used as a preservative, as have certain proprietary mixtures of compounds of copper, chromium and arsenic referred to in the wood preservation industry as CCA. All of the aforementioned treatment agents suffer from one or more drawbacks, principally because they are highly toxic and/or hazardous to humans and/or the environment. Such hazards can cause problems: (1) during the initial treatment process (for example, soil and ground water contamination, toxic exposure to workers); (2) during transportation and installation (for example, toxic exposure during handling, contamination of transportation and installation equipment); (3) during use (for example, by soil and ground water contamination through leaching, toxic exposure to consumers); and, (4) during disposal (for example, toxic exposure during burning, soil and ground water contamination after decay). Environmental regulations and lawsuits relating to personal injuries suffered by persons exposed to treated wood products are making it impractical to continue to use such preservation agents. Moreover, prior art preservation agents have not been entirely suitable for their intended purposes because of other drawbacks. These include undesirable coloration of the treated wood, the need to use high temperatures and/or pressures in the treatment process, the use of toxic or environmentally dangerous chemicals, lack of penetration, case hardening, etc. Most importantly, however, the treating agents have not satisfactorily protected the wood against leaching of the preservation or treating agent, especially wood used for exterior applications and/or for contact with moisture.

The amount of deterioration of wood exposed to exterior environmental condition varies widely, depending on the type of wood involved. For example, it is well known that of the woods commonly found in the United States, redwood and cedar are examples of those which have better than average weathering characteristics. For this reason, these woods are often used for such applications as shingles, patio furniture, decking, fence posts, etc. On the other hand, woods such as pine and fir have poor exterior weathering characteristics, and typically, these woods must be treated (and usually constantly retreated) in some manner or used in applications where preservation is not required. It is unfortunate, but readily apparent from the foregoing examples, that the better quality weathering woods are more expensive and less available, while those woods which are cheaper and more abundant are not as desirable from a deterioration standpoint.

It is also known that certain woods and barks have extremely good weathering properties. Such woods and barks include acacia negra, quebracho, mangrove, eucalyptus marginata, chestnut oak, cedar, etc.

The use of substances from such decay and weather resistant woods or barks to impart improved properties to other types of wood is known. For example, in U.S. Pat. No. 3,635 issued June 24, 1844 to Specher for "Improvement in Coloring and Hardening Wood", tannin or tannic acid from oak bark or other woods having high tannin levels is extracted by boiling the starting material in a potash lye solution for a time sufficient to extract the tannin. Wood to be treated is then soaked for several weeks in the resultant solution to impregnate the wood with the tannin-containing extract. Clear water soaking is then used to remove the potash. Iron or copper salts may be used to help darken the wood by immersing the impregnated material into solutions of such salts. The salts are suggested solely as coloring agents. The patent also suggests the same treatment for improving the properties of manila, grass, hemp and other cordage material, and ship rigging. The patent does not teach or suggest the extract and fixation processes of the present invention and, in fact, does not recognize the leaching and fungi attack problems which have now been demonstrated for woods which are merely soaked in tannic acid or tannin.

Another approach to wood preservation is described in U.S. Pat. No. 70,761, issued to Taylor on Nov. 12, 1867 for "Improved Process of Preventing Wood Decay". The patent describes the use of an extraction of oak bark in combination with creosote, acetic acid, wood vinegar, lamp black and kerosene to increase the decay resistance of a wood product. It is suggested that pressure or heat will improve the impregnation and that the tannin content is increased by coagulation thereof with the albumin in the wood. The process is carried out in a retort. In addition to using materials now known to be undesirable from environmental and safety standpoints, the leaching phenomenon and other aspects of the present invention are not considered in the teachings of this patent.

In U.S. Pat. No. 84,733 issued Dec. 8, 1868 to Cowling for "Improvement in Preserving Wood", tannin is mentioned as one substance which can be added to superheated steam to improve the properties of wood. The other suggested substances include coal tar, resins, petroleum, linseed oil, salt, creosote and other analogous compounds.

In U.S. Pat. No. 107,904 issued Oct. 4, 1870 to Hayes for "Improvements in Preserving Wood", tannic acid is added to steam and passed into an airtight chamber to impregnate wood with additional tannin, to form a leathering substance in the wood fiber and to form insoluble compounds with the wood organic matter. The patent relates primarily to the improved impregnation resulting from the use of steam. The patent also indicates that any substance containing tannin may be used, but does not suggest the source of such materials.

In U.S. Pat. No. 142,892 issued Sept. 16, 1873 to Bretonniere for "Improvement In Producing Coloring Matter From Vegetable Substances", tannic acid is mentioned as one of a long list of substances which may be charged into a wood-coloring material in combination with alkaline sulfurates.

In U.S. Pat. No. 216,589 issued June 17, 1879 to Wellhouse, et al for "Improvement In Preserving Wood", a process is described which comprises subjecting wood first to a solution of zinc chloride and gelatins and then to a solution of tannin to render the gelatin insoluble.

William Augustus Hall was issued nine United States patents between 1908 and 1910 relating to wood coloring and preservation. In U.S. Pat. No. 901,095 issued Oct. 13, 1908, for "Art Of Coloring Wood", a process is described which comprises first boiling the wood under pressure in water to soften the resinous products in the wood, and then rendering the wood absorbent by applying vacuum to remove the water. A coloring matter containing tannin salts and extracts of logwood or hemlock are added under hydraulic pressure. The initial boiling step is used to darken the wood, and the tannin and extract are used to further darken and develop the grain of the wood.

In his U.S. Pat. No. 901,096 issued Oct. 13, 1908 for "Art Of Treating Wood For Lumber", Hall discloses a different process in which vacuum is first applied to the wood, followed by a coloring solution impregnation step under pressure, and a final boiling step to diffuse the color into the wood. Extracts of spruce bark, hemlock bark, or mahogany bark are suggested as coloring agents.

In U.S. Pat. No. 901,097 issued Oct. 13, 1908 for "Artificially Grained Or Figured Wood And Process Of Producing The Same", Hall describes another process involving vacuum treatment followed by solution impregnation of a pigmented material. The pigment is deposited mainly in the more porous sections of the cheaper wood to be treated, while the denser sections are stained without pigment deposit. The coloring materials which are suggested include alkaline solutions of suitable bark such as hemlock, oak, or spruce, or any suitable anhydide of tannin.

Another process is described in his U.S. Pat. No. 901,098 issued Oct. 13, 1908 for "Art Of Coloring Wood". In this process, the cheaper wood is first subjected to a vacuum step to render it absorbent following which a staining solution is forced into the wood under high pressure. The wood is then boiled or cooked in the staining solution for a "long time" to diffuse the coloring matter. Once again, the suggested stain is a material selected from the group of bark extracts or tannin anhydrides.

In U.S. Pat. No. 901,099, issued Oct. 13, 1908 for "Art Of Coloring Wood", Hall uses salt solutions or a solution of dye-wood or hemlock bark or anhydrides of tannin as the coloring agent, and a process which comprises a first coloration step in a high-temperature solution of the coloring agent followed by a cold coloration step. The cold step contracts the wood and draws the solution into the surface of the wood until it reaches the desired shade.

In U.S. Pat. No. 913,128, issued Feb. 23, 1909 for "Art of Coloring Wood", Hall describes the use of extracts obtained from the wood or bark of trees such as hemlock, oak or chestnut as coloring agents. The process therein described comprises using the coloring agent in an ammoniacal solution which is impregnated into the cheaper wood under high pressure, either with or without prior vacuum exhaustion of air from the wood.

Hall discloses yet a different wood treating process in U.S. Pat. No. 924,770 issued June 15, 1909 for "Art of Treating Wood for Lumber". In this patent, the wood is treated by impregnating it with phlobaphenes of wood barks, such as mahogany, oak, and hemlock. The absorption is assisted by hydraulic pressure of about 250 psi. Wood coloring rather than preservation is the principal subject of this patent. In U.S. Pat. No. 933,435 issued Sept. 7, 1909 for "Art of Coloring Wood", Hall describes a process in which a solution of coloring extract such as that made from the the bark of hemlock, spruce or oak is selectively introduced in varying degrees into the outer and inner surfaces of the wood by using penetrating substances having different penetrating capabilities and by varying the capillarity of the wood.

In his U.S. Pat. No. 964,017 issued July 12, 1910 for "Art of Transforming Wood", Hall teaches yet another method for changing the color of wood. This method comprises using "colorless" salts in solution to treat wood. The salts suggested included ferrous salts, sodium carbonate and other similar salts. It is suggested that the salts react with the tannic acid contained in the wood to darken the wood, and that the wood will become darkest in the areas of highest tannic acid concentration, e.g., in the areas of the annular rings.

De Cew, in his U.S. Pat. No. 1,010,122 issued Nov. 28, 1911 for Preserved Wood and Process for Making Same", suggests the use of waste sulfite liquor to harden wood and to increase its flame-resistant properties. De Cew also suggests that such treatment results in an insolubilization of the albumin in the wood by the tanning properties of the waste sulfite liquor. A similar process is described in the Mar. 25, 1913 U.S. Pat. No. 1,057,211 issued to Baekeland for "Method of Impregnating Wood and Products Thereof".

In U.S. Pat. No. 1,670,086 issued May 15, 1928, Walker discloses a process for making marine pilings more resistant to marine borers. The process involves impregnating the pilings with a solution of an organic dye such as crystal violet, chrysoidine, or malachite green. It is suggested by the patentee that these materials combine with certain substances in the wood, e.g., cellulose, lignin or tannin to form a new substance which is lethal to the marine borers.

Mengel, in his U.S. Pat. No. 1,774,940 issued Sept. 2, 1930 for "Coloring Walnut Veneer Sheets", describes a process for coloring the sap wood of black walnut veneer sheeting to conform the color to that of the heartwood. The coloring is accomplished with a solution of hot water, chestnut extract (or tannic acid in any form), and a small amount of an iron salt such as ferrous sulfate or ferrous chloride. The veneer is dried and pressed after coloring.

A "Wood Treatment and Product" are disclosed in U.S. Pat. No. 2,062,897 issued to Goodale on December 1, 1936. Arsenic compounds and a protective colloid compatible with the tannin in the wood to be treated are impregnated into the wood to make it more resistant to attack by marine borers, termites, and the like.

Forty-three years later, on Feb. 21, 1978, U.S. Pat. No. 4,075,394 was issued to Meyer for "Process of Inhibiting Tannin Migration in Tannin-Containing Wood Substrates". The process comprises treating a substrate with an aqueous solution of a polyalkylenimine, such as polyethylenimine. A related process is described in Meyer, et al. U.S. Pat. No. 4,218,516 issued Aug. 19, 1980 for "Pigment for Blocking Tannin Migration". In the latter, the patentees use a stain-inhibiting amount of magnesium hydroxide-tannin complex in the treated wood. Both patents relate to preventing stain streaking when films, e.g., paints are applied to high-tannin content woods such as redwood, cedar, or mahogany.

Mitchell, et al., in U.S. Pat. No. 4,270,688 issued Sept. 2, 1980 for "Protecting Wood from Wood Degrading Organisms", describe a method for treating wood by first pressure-impregnating the wood in a tannic acid-ethanol solution, followed by pressure-impregnation with a solution of a metal salt which will complex with both the impregnated tannic acid and with the wood. The process is directed to preventing attack of wood by degrading organisms such as termites, fungi and marine borers. The tannic acid impregnation step uses concentration of from 5–50%, while the metal salt is used in concentrations of 1–50%. The tannic acid or salt solutions can be impregnated under pressures of from 20–100 psi.

In addition to the above-mentioned patents which refer to wood treatment, the present inventors are aware that certain tannin containing extracts are being, and have been, used for a number of years for tanning leather, a process which in and of itself is well known. Many of such extracts which are now being used in the United States are derived from various parts of plant species which are foreign to the United States. Some of such extracts are derived from some of the same woods which supply the weathering resistant woods currently being imported, reference to which has previously been made in this section of the specification. Such extracts perform the preservative function of tanning leather and in addition, provide a coloring function. Such extracts are currently being used to treat fishing nets, but are also used for such diverse purposes as additives for drilling well muds, etc.

While research has been underway for more than a century to discover ways of converting relatively cheaper woods into wood products which are resistant to weathering, fungi, borers, insects, etc., the present inventors are not aware of any commercially viable treatment systems, except those involving environmentally damaging substances such as creosote, arsenic such as in certain proprietary mixtures of ammonia, chromium and arsenic compounds referred to as ACA or certain proprietary mixtures of copper, chromium and arsenic compounds referred to as CCA, (such as ammonium-chromium-arsenate (ACA) or copper-chromium-arsenate (CCA)), or pentachlorophenol. A method for treating wood in a commercially and environmentally suitable process, and the wood product prepared and sometimes aesthetically enhanced by such method would represent substantial advances in the art.

OBJECTS AND SUMMARY OF THE INVENTION

The primary object of the present invention is to provide a unique process for converting pressure permeable wood species which are relatively less resistant to weathering and attack by molds, fungi, insects, etc., to a wood product which is relatively more resistant thereto and which overcomes the above-noted disadvantages of the methods disclosed in the aforementioned patents.

Another object of the present invention is to provide a method of wood preservation which does not employ environmentally detrimental or hazardous substances.

A further object of the present invention is to produce treated pressure permeable wood which can meet and exceed recognized industry standards, such as those set by the American Wood Preservers' Association (M10-77) and/or testing under ASTM D-1413.

A further object of the present invention is to provide a method of wood preservation which also provides wood coloration capabilities.

A still further object of the present invention is to provide a method for wood preservation which produces a wood product which maintains its enhanced properties during extended use and weathering.

Yet another object of the present invention is to provide a wood preservation method which does not require the use of expensive, flammable or toxic solvents which would need to be reclaimed in the manufacturing process.

A different object of the present invention is to economically convert a pressure permeable wood species having poor weathering and resistance properties into a treated wood product having vastly improved weathering and decay resistance properties.

How these and other objects of the invention are accomplished will be described in the following detailed description of the preferred and alternate embodiments of the invention. Generally, however, the objects are accomplished by first obtaining a tannin extract from a plant species which is known to have desirable weathering and other resistance properties. The tannin extract may be obtained from any part of the plant, such as the tree itself, leaves, bark, pods, roots, nuts, etc. The plant species could be acacia negra, quebracho, eucalyptus, or any of the other species identified later herein, the only requirement for the plant extract being that it contain those components of the resistant species which impart the resistant qualities thereto. Such components will contain tannins, but they all contain other substances as well. The tannin extract, sometimes in combination with certain metallic salts, is impregnated into a pressure permeable wood species which has poor weathering and resistance properties. A unique and separate impregnation step fixes these impregnated materials to prevent leaching during use of the wood, especially leaching due to exposure to outdoor weathering conditions and ground contact. Other ways in which the foregoing objects of the invention are accomplished will become apparent to those skilled in the art after the balance of this specification has been read and understood.

DETAILED DESCRIPTION OF THE PREFERRED AND ALTERNATE EMBODIMENTS

Before proceeding to the description of certain examples which illustrate the process of and the beneficial results obtained by following the teachings of the present invention, it will be helpful to establish several general categories of substances and materials which are useful herein.

First, the wood to be treated can be selected from a wide variety of woods. However, most desirably, such wood will be selected from pressure permeable wood species which are relatively inexpensive, in abundant supply, and yet which do not have particularly good color, weatherability, or resistance to molds, fungi, insect infestation, etc. Examples of woods which fall into this category are the firs and pines. These woods will be mentioned in the examples, but it should be understood that other pressure permeable woods species can be treated using the process of the present invention. These woods will hereafter be referred to as the wood receiver.

Second, the tannin extract material to be used in the wood preservation and/or coloration process of the present invention can also be selected from numerous materials, and the particular substances mentioned in this paragraph should be taken as illustrative rather than limiting. In general, the materials comprise spray dried, solid or concentrated solutions of tannin extracts from certain plants, e.g., trees, brush, shrubs. In addition, the extracts can be obtained from a particular part of the plant or a combination of parts, e.g., the root, bark, heartwood, limbs, leaves, pods, nuts, etc., of the selected material. The general requirement for the plant material, which will hereinafter be referred to as the tannin extract donor, is that it have good weatherability, resistance to mold, fungi, attack by various organisms, or have good coloring characteristics, or combinations of the foregoing properties which are superior to that or those of the wood receiver. Examples of plants which may be used as tannin extract donors are as follows (with the principal country or region of availability being shown in parenthesis): wattle, also known as acacia or mimosa (South Africa, South America, especially Brazil); quebracho (Argentina, Paraguay and Brazil); chestnut (France and Italy); myrobalan (India); mangrove (swampy, tropical areas such as southern Florida, Columbia, Brazil, Africa); divi divi (western coast of South America); eucalyptus (Australia and South America); tara (Peru); sumac (Sicily, Albania and Yugoslavia); cypress (United States); gambier (Malaysia, Sumatra, Borneo); and chestnut oak (blighted in the United States, but available from numerous other sources).

The tannin extracts are obtained in ways similar to those employed in obtaining tanning extracts for use in tanning leather. The tannin extracts useful in the present invention are water-soluble and may be obtained by extracting the tannin extract donor in water. The tannin extract donor will typically be used in a comminuted form, so more surface area will be exposed to the extracting liquid. It is desirable for purposes of the present invention to extract as much of the active substances from the tannin extract donor as possible during the extraction step.

Preferably, the solution of tannin extract is then reduced to a powder form, e.g., by distillation of the water therefrom, and spray-drying. Of course, this reduces the need to transport large amounts of water over long distances, especially in those cases where the source of the tannin extract donor is many, many miles from the location at which the wood receiver will be treated. It has been found that tannin powders, concentrated liquids, or solid tannin extracts have good shelf life properties and may be exposed to a wide range of temperatures during transportation.

The tannin extracts, when they are being prepared for use in the system of the present invention, are diluted with water so they can be pressure injected into the pressure permeable wood receiver. The tannin extracts can be used in water solution in widely varying amounts, from 1% or less up to substantially greater concentrations. The preferred range is from about 1 to about 10 weight % of the solid tannin extract in water.

The extracted tannins heretofore described may be used as the sole wood preservation material or they may be combined with certain metal salts, such as the metal salts described in the patents mentioned earlier in the specification. Such salts may be used for a variety of purposes (such as those described in such patents), but we have recognized that they may enhance the preservation properties of the system of the present invention, perhaps synergistically so, and can also be used for coloration effects as well. The amount of metallic salt can also vary widely, but the preferred range is from about 1 to about 10 weight % of the heavy metal salt in aqueous solution. Examples of metallic salts which are useful herein include zinc salts, chromium salts, copper salts, iron salts, aluminum salts, especially the chlorides and sulfates thereof.

The third component of our system (the first being the tannin containing extract and the second being the matallic salt in some embodiments) is a fixative material. The term fixative is employed to describe the functions of the material, i.e., to prevent leaching of the tannin extract and/or the extract and metallic salt combination from the wood species after it has been impregnated. The fixative is preferably a non-ionic surface active agent which can be selected from the numerous commercially available water soluble materials in this class of components. Non-ionic surface active agents have no discrete charge when dissolved in water, and at this point in the description it will become apparent that all treating materials used herein are used in water solution. We have therefore eliminated all the aforementioned problems which can be encountered when solvents, such as alcohols, are used.

Those non-ionic surfactants which are especially useful in the present invention are entirely water soluble in the range of 70° F. to 160° F. and have a HLB number generally between 7 to 15. Those having significantly lower HLB numbers are not sufficiently water soluble, while those having significantly higher HLB numbers are so water soluble that they do not act effectively as fixatives for the impregnated wood. Non-ionic surfactants having values below 7, can be used however, if they can be incorporated into an aqueous solution in a suitable manner.

One further desirable property for the selection of the non-ionic surfactant is that it be biodegradable, as well as being effective as a fixative. If the fixative material selected has this additional property, effluent treatment or disposal problems will not be a concern to the facility carrying out the treatment system of the present invention.

In addition to the non-ionic surfactants, cationic surfactants, a number of which are commonly available, can also be employed, but anionic surfactants have been found generally not to be effective.

Examples of suitable non-ionic surfactants which can be used, alone or in combination, in the present invention include sulfonates, laurates, oleates, glycerol compounds, ethoxylate blends, ethoxylated caster oils, ethoxylated fatty acids, oxyethylated alcohols, nonyl phenol ethoxylates and octylphenol ethoxylates, mono and tri-stearates, alkylaryl polyether alcohols and the like. Examples of suitable cationic surfactants which may be used in the practice of the present invention include certain ethoxylated fatty amines, quaternary ammonium chlorides, etc. Numerous directories are commonly available listing surfactants, their type (non-ionic, cationic, etc.) as well as the HLB number and such directories provide guidance in the selection of suitable materials for use in the practice of the present invention.

The fixative also may be used in varying quantities which will depend in large measure on the tannin extract or extract/salt combination employed. The preferred range, however, is 0.1% to 5% parts by weight of the non-anionic surfactant in water. The amount will also depend in part on the activity level of the surfactant, which as is known to the art, can vary from material to material.

While perhaps not all of the reasons for the effectiveness of the system of the present invention are fully understood, we have observed that when an aqueous solution of a non-ionic surfactant at ambient temperature is added to an aqueous solution of a tannin extract of the type referred to earlier, a cloudy precipitate forms immediately. Upon examination, the precipitate is soft, gum-like and very resistant to being re-dissolved in water, even if the temperature of the water is raised. It is accordingly believed that when the wood receiver is impregnated first with the tannin extract and then with the dilute aqueous solution of the non-ionic surface active agent, the same gum-like water insoluble material is formed in and on the wood receiver. Thus, leaching of the tannin extract from the wood receiver is prevented, which ensures the longevity of the beneficial properties of the tannin extract, e.g., decay resistance and the other properties mentioned above.

Several different treatment systems employing the principles of the present invention will now be discussed. In the first example, a pressure permeable wood species (ponderosa pine) is first treated with an aqueous 4% by weight solution of tannin extract (acacia negra extract was used in this and the following examples), following which the wood was treated with a 1% solution of a non-ionic surfactant (Triton N-101 sold by Rohm and Haas was used as the fixative in this and the following examples). The treated wood species was then evaluated for decay prevention in a university laboratory following leaching using the "Standard Method Of Testing Wood Preservatives By Soil Block Cultures #M10-77" as specified by the American Wood Preservers' Association. The results were excellent in that the average weight loss of test specimens with *Gloeophyllum Trabeum* Mad-617 and *Poria placenta* Mad-698 was 1.8%, whereas untreated lumber had a weight loss of 35%.

In other examples, we have found that commercially available metallic salts may provide additive, and perhaps even synergistic, results when employed with the basic system, an example of which is set forth in the preceeding paragraph. It is believed that such improved results occur because of a further decrease in the solubilization of the tannin extract, resulting in additional decay resistance after leaching of the treated wood following the fixative step. For example, aluminum sulfate may be mixed with the tannin extract as part of the first treatment step, i.e. an aqueous solution of 4% by weight of tannin extract and 1% by weight of the aluminum sulfate. Following treatement by the fixative, excellent preservation properties were obtained.

Color alteration of the wood species may also be obtained with the system of the present invention. For example, if an iron salt (e.g. ferric chloride) is substituted for the alumunim salt of the previous example, a gray to black treated wood is obtained. After addition of the fixative, the wood receiver is decay resistant and is also resistant to color change after leaching tests.

As pointed out in some of the patents mentioned earlier in this specification, certain metal salts such as zinc sulfate, copper sulfate and chromium sulfate are known to confer decay resistance properties to pressure permeable wood species. However, the effectiveness of these salts in the past has gradually deteriorated due to leaching. These salts may, according to the present invention, be admixed with the tannin extract for the initial impregnation step, followed by the fixative. For example, the pressure permeable wood species is first treated with a 4% by weight aqueous solution of the tannin extract and a 1% by weight solution of zinc chloride. Following this initial treatment, the fixative is employed. Using this combination, we have noted that an improved insolubilization is accomplished, thus confirming improved decay resistance over a broader spectrum.

In addition to the system described in the last paragraph, the technique may be varied by using the tannin extract alone in the first step, followed by treatment with a combination of one or more of the metallic salts and the fixative or a three step process using tannin extract, metallic salt or salts and then fixative may be employed. For example, the wood receiver is first treated with a 4% by weight aqueous solution of the tannin extract, followed by a fixative solution containing 1% by weight solution of the fixative and 1% by weight of basic chromium sulfate. Decay resistance, as measured by the aforementioned Association test, was determined to be excellent.

In the present invention, the impregnation of the extract and fixative (and metallic salts, if used) are carried out in an autoclave or retort in which an aqueous solution of the tannin extract is forced into the wood receiver at ambient elevated temperatures and pressure using procedures and equipment currently used in the wood preservation industry. The time will vary depending on the type, size and surface area of the wood to be treated and the depth of penetration desired.

Following the first impregnation step, the fixative is impregnated in a similar fashion. The thus-treated wood is then ready for distribution to the relevant marketplace. The only changes in equipment which may need to be made would be to the interior surfaces of the autoclavis or retorts, in that existing equipment may react with the tannin extract or may be subject to attack by certain metallic salt if they are used. Changing the equipment lining or lining the existing equipment with different materials will overcome these problems.

During the course of our work, the anti-leaching benefits obtained in treatment systems involving tannin extracts and a fixative or tannin extracts and metallic salts and a fixative lead to a further embodiment of the invention, i.e. the fixation of resistance enhancing materials in certain wood species by the impregnation of a fixative therein. For example, and as noted earlier in the specification, cedar and redwood are in good supply and do have considerably better resistance properties than do the pines and firs. However, it is known that such properties deteriorate over time, especially if the cedar or redwood is used for outdoor applications or in applications where the wood is contacted by water.

We have found that by impregnating redwood or cedar with the fixative materials described above, the original resistance properties can be maintained, even after leaching tests. Of course, the metallic salts could also be employed with the fixative in this embodiment if desired for any of the above-referenced purposes, including further coloration of the cedar or redwood. As long as the original wood species is pressure permeable, this concept could be adapted to other wood species which normally have relatively good resistance properties, but which lose such properties over time due to leaching. Accordingly, this embodiment is not to be limited to cedar or redwood. Those two materials have been mentioned by way of example, rather than limitation.

While the present invention has been described in connection with certain preferred materials and processing sequences, the invention could be variously adapted by one skilled in the art after the present specification has been read and understood. Hence, the foregoing description of the invention is not to be taken as limiting as to its scope, but rather the scope of the present invention is to be limited solely by the scope of the claims which follow.

We claim:

1. An organic solvent-free process for treating a pressure permeable wood species having poor resistance to decay, weathering, leaching, insect attack, fungal attack or the like, which comprises the steps of:

a. preparing an aqueous solution of tanni extract obtained from one or more plant materials from one or more plant species which have been found to possess resistance to decay, weathering, insect attack, fungal attack or the like;

b. impregnating said wood species with said aqueous extract solution wherein said aqueous extract solution comprises from about 1 to 10 weight % of tannin extract; and c. subsequently impregnating said wood species with an aqueous solution of a fixative to prevent leaching of the extract from said wood species, said fixative being selected from the group consisting of non-ionic surface active agents and cationic surface active agents wherein said aqueous fixative solution comprises from about 0.1 to about 5 weight % of said fixative.

2. The process set forth in claim 1 wherein said wood species is lumber selected from the group consisting of pines and firs.

3. The process set forth in claim 1 wherein said plant material is selected from the group consisting of bushes, trees, shrubs, bark, heartwood, leaves, roots, pods or nuts of said plant species.

4. The process set forth in claim 1 wherein said plant species is selected from the group consisting of acacia negra, quebracho, chestnut, myrobalan, mangrove, tara, eucalyptus, divi divi, sumac, cypress, gambier, or chestnut oak.

5. The process set forth in claim 1 wherein said fixative is an aqueous solution of a non-ionic surface active agent.

6. The process set forth in claim 5 wherein said fixative is an aqueous solution of one or more non-ionic surface active agents having HLB numbers in the range of about 7 to about 15.

7. The process set forth in claim 1 further comprising treating said wood species with an aqueous solution of a metallic salt wherein said metallic salt solution comprises from about 1 to about 10 weight % of said metallic salt.

8. The process set forth in claim 7 wherein said metallic salt is selected from the group consisting of zinc, aluminum, chromium, iron and copper salts.

9. The invention set forth in claim 8 wherein said aqueous metallic salt solution is mixed with said extract solution.

10. The invention set forth in claim 8 wherein said aqueous metallic salt solution is mixed with said fixative solution.

11. The process set forth in claim 7 wherein said metallic salt treatment occurs between step b and step c.

12. The treated wood product prepared by the process of claim 1.

13. The treated wood product prepared by the process of claim 2.

14. The treated wood product prepared according to the process of claim 3.

15. The treated wood product prepared according to the process of claim 4.

16. The treated wood product prepared according to the process of claim 5.

17. The treated wood product prepared according to the process of claim 6.

18. The treated wood product prepared according to the process of claim 7.

19. The treated wood product prepared according to the process of claim 8.

20. The treated wood product prepared according to the process of claim 9.

21. The treated wood product prepared according to the process of claim 10.

22. The treated wood product prepared according to the process of claim 11.

23. An organic solvent-free process for treating a pressure permeable wood species selected from the group consisting of pines and firs which comprises the steps of:

a. preparing an aqueous solution of tannin extract obtained from one or more plant materials selected from the group consisting of bushes, trees, shrubs, bark, heartwood, leaves, roots, pods or nuts from one or more plant species selected from the group consisting of acacia negra, quebracho, chestnut, myrobalan, mangrove, tara, eucalyptus, divi divi, sumac, cypress, gambier, or chestnut oak;

b. impregnating said wood species with said aqueous extract solution; and c. subsequently impregnating said wood species with an aqueous solution of a fixative selected from the group consisting of non-ionic surface active agents and cationic surface active agents, wherein said aqueous extract solution comprises from about 1 to about 10 weight percent of tannin extract and wherein said aqueous fixative solution comprises from about 0.1 to about 5 weight percent of said fixative.

24. The process set forth in claim 23 wherein said fixative is an aqueous solution of one or more non-ionic surface active agents having HLB numbers in the range of about 7 to about 15.

25. The process for treating a pressure permeable wood species selected from the group consisting of pines and firs which comprises the steps of:

a. preparing an aqueous solution of tannin extract obtained from one or more plant materials selected from the group consisting of bushes, trees, shrubs, bark, heartwood, leaves, roots, pods or nuts from one or more plant species selected from the group consisting of acacia negra, quebracho, chestnut, myrobalan, mangrove, tara, eucalyptus, divi divi, sumac, cypress, gambier, or chestnut oak;

b. impregnating said wood species with said aqueous extract solution;

c. subsequently impregnating said wood species with an aqueous solution of a fixative selected from the group consisting of non-ionic surface active agents and cationic surface active agents, wherein said aqueous extract solution comprises from about 1 to about 10 weight percent of tannin extract and wherein said aqueous fixative solution comprises from about 0.1 to about 5 weight percent of said fixative; and d. impregnating said wood species with an aqueous solution of a metallic salt selected from the group consisting of zinc, aluminum, chromium, iron and copper salts and wherein said aqueous metallic salt solution contains from about 1 to about 10 percent of said metallic salt.

26. The process set forth in claim wherein said fixative is an aqueous solution of one or more non-ionic surface active agents having HLB numbers in the range of about 7 to about 15.

27. The process set forth in claim 25 wherein said metal salt solution is mixed with said tannin extract solution and impregnated into said wood species during step b.

28. The process set forth in claim 25 wherein said metallic salt solution is mixed with said fixative solution and is impregnated into said wood specied during step c.

29. The process set forth in claim 25 wherein said metal salt solution impregnating step occurs between steps b and c.

* * * * *